(12) United States Patent  (10) Patent No.: US 8,213,595 B2
Janssen  (45) Date of Patent: Jul. 3, 2012

(54) SYSTEM AND METHOD TO ADJUST CALLER ID INFORMATION

(75) Inventor: Holger Janssen, Richmond (CA)

(73) Assignee: VTech Communications Limited, Hong Kong (HK)

( * ) Notice: Subject to any disclaimer, the term of this patent is extended or adjusted under 35 U.S.C. 154(b) by 1369 days.

(21) Appl. No.: 11/833,733

(22) Filed: Aug. 3, 2007

(65) Prior Publication Data

US 2009/0034705 A1  Feb. 5, 2009

(51) Int. Cl.
*H04M 1/00* (2006.01)
*H04M 3/00* (2006.01)

(52) U.S. Cl. ............ 379/355.08; 379/353; 379/354; 379/355.02; 379/355.1

(58) Field of Classification Search ......... 379/142.01, 379/142.04, 142.06, 142.1, 142.14, 142.17, 379/355.02, 355.05, 355.06, 355.07, 355.08, 379/355.1, 372, 353, 354
See application file for complete search history.

(56) References Cited

U.S. PATENT DOCUMENTS

| | | | | |
|---|---|---|---|---|
| 5,422,938 A | * | 6/1995 | Yamanishi | 379/142.01 |
| 5,559,862 A | * | 9/1996 | Bhagat et al. | 455/460 |
| 5,764,731 A | * | 6/1998 | Yablon | 379/88.15 |
| 5,963,876 A | * | 10/1999 | Manssen et al. | 455/564 |
| 6,324,272 B1 | * | 11/2001 | Abu-Shukhaidem et al. | 379/142.06 |
| 6,360,108 B1 | * | 3/2002 | Rogers | 455/564 |
| 6,449,475 B1 | * | 9/2002 | Chinnaswami | 455/415 |
| 6,963,640 B1 | * | 11/2005 | Manning | 379/355.08 |
| 7,945,603 B2 | * | 5/2011 | Van Natter et al. | 707/830 |
| 2004/0229644 A1 | * | 11/2004 | Heie et al. | 455/551 |

* cited by examiner

*Primary Examiner* — Binh Tieu
(74) *Attorney, Agent, or Firm* — McAndrews, Held & Malloy, Ltd.

(57) ABSTRACT

A method for adjusting caller ID information includes receiving at a call device a caller ID message that includes a calling number. An address book associated with the call device is searched. An address book telephone number having the matching area code or local exchange number is analyzed to determine if the first digits of both address book phone number and calling number constitute a "1." If the first digit in both numbers is the same, the calling number is stored unadjusted, while if the first digits differ, the calling number is adjusted. A method for adjusting caller ID information includes comparing the format of a received calling phone number to a set of predetermined criteria that are used to enable a "truncate" function in a context-sensitive "delete" button only when a predetermined criterion is met. Accordingly, a user is provided with a means to assure in a single pressing of a button that the proper deletion of numbers takes place for any calling number that is identified as needing truncation.

25 Claims, 8 Drawing Sheets

SYSTEM AND METHOD TO ADJUST CALLER ID INFORMATION

BACKGROUND

1. Field of the Invention

Embodiments of the present invention relate generally to the field of telephones, and more particularly to caller ID systems.

2. Background of the Invention

A large percentage of phones, such as home or office phones, are equipped to receive caller identification (ID) information that identifies a caller to a party at the called phone. In turn, subscribers to a caller ID service typically use phone equipment that is configured to store caller ID information associated with the calling party, including the phone number of the calling party. This provides a convenient method for the called party to return a missed call when the called party is not available to answer a phone call. By storing the phone number, the caller ID service provides the essential information needed by the called party to contact the calling party of the missed call, as desired. Typically, the calling party information is stored in a call log that can be accessed through a user interface, such as a keyboard and graphical menu contained on an LCD display associated with the called party's phone. The user can select the phone number displayed and dial that number to reach the calling party. Ideally, this could be done by using a "select" key that serves to dial the selected number in a graphical menu.

However, depending on the configuration of a caller ID service, a central office (CO) may not provide the calling party number in a format that allows the called party to dial the calling party without performing additional operations. Often a number or numbers must be added or deleted from the calling party number provided to the user before the calling party number can be successfully dialed. For example, some COs may send a 10-digit caller number (CN) (the term "caller ID number" is used interchangeably herein with the term "calling party number" or "calling number" unless noted otherwise) that is stored in a caller ID message, in which the area code and local number of the caller are contained. However, the CO may still require the user to dial 11 digits to reach the calling party (i.e., "1" followed by the 10-digit CN). As a result the user can not dial directly from the CID log and needs to manually change the received CID number before dialing the called party.

In addition, for a call received from a caller in the same area code, a CO may send a 10-digit CID (e.g., receive aaa xxx xxxx), but may require the area code "aaa" to be deleted from the provided number in order to make the call (i.e., dial xxx xxxx). However, the number stored in the call log on the called party's phone will include the whole ten-digit number. Thus, the caller must manually remove the three-digit area code from the stored caller ID information before attempting to place a return call to the calling party.

Several approaches have been attempted to address these problems. Some systems offer a means to cycle through different dialing options, such that the number to be redialed is a variant of the number received. Based on a standard seven-digit sequence for a unique number within an area code, the user might be provided with a menu to select 7, 8, 10, and 11-digit variants of the received ID depending on whether the calling party is in an area code different from the user and whether the user must pre-pend the number "1" before dialing the calling party number. For example, a user might be required to hit the # key to select between 7, 8, 10, and 11-digit options. Another system provides an option for the user to manually add or remove the number "1" at the beginning of the calling party number and to add or remove an area code associated with the calling party. For example, a user may be provided with a menu that instructs the user to press the number "1" to add "1" to the dialing sequence for a received caller ID number as needed. This also effectively allows the user to manually choose a 7, 8, 10, or 11-digit variant of the calling party number. Still other systems allow a user to manually enter and store in a phone memory a number of Local Area Codes (LAC) that do not require a "1." The system will then automatically pre-pend a "1" to any 10-digit CID that does not match any of the stored LACs. Still another system instructs a user to press the number "3" to prepend an area code in front of a displayed caller ID number before dialing the number.

To address the case where a CO requires that a local number be dialed without a pre-pended area code, some phones allow a user to enter and store a 3-digit Home Area Code (MAC). Upon receiving a 10-digit CID that starts with the 3-digit HAC, the phone system removes the HAC from the CID (i.e., changes the phone number from hhh xxx xxxx to xxx xxxx, wherein "hhh" is the HAC that was entered by user. All other CIDs (i.e., wherein area code does not match HAC) may be left unchanged.

However, each of the above approaches requires manual intervention of the user to either change the displayed CID before dialing the correct number, or to enter and store a set of local area codes when setting up a phone. Also, the user interfaces may not be intuitive or may burden the user with having to remember key codes, further discouraging a user from using those approaches. For example, it may not be intuitive to a large number of users that a # key be pushed to enable a user to select between 7, 8, 10, and 11-digit options for a caller ID) number, or that the number "3" needs to be depressed to add an area code to a number. Accordingly, the user often is confronted with the necessity of reading or rereading instructions or prompts to successfully perform such operations.

BRIEF SUMMARY OF THE INVENTION

In one embodiment of the present invention, a method for adjusting caller ID information includes the step of receiving at a call device, such as a telephone, a caller ID message that includes a calling number (CN). The calling number may comprise a local exchange number and an area code. The address book associated with the call device is searched. An address book telephone number entry having an area code or local exchange that matches that of the calling number is identified.

For example, the telephone answering device may automatically scroll through an address book until the first phone number with an area code matching the calling party is found. The address book telephone number having the matching area code or local exchange number is analyzed to determine if the first digits of both the address book phone number and calling number constitute a "1." If the first digit in both numbers is the same, the calling number is stored unadjusted. If the first digit of the calling number is different, then in the calling number as compared to the address book number, the calling number is adjusted.

For example, if the calling number fails to have a pre-pended "1," the calling device adds a "1" to the beginning of the received CID phone number if and only if there is a "1" located at the beginning of the phone number (pre-pended) that is stored in the address book phone number having the matching area code. The adjusted CID phone number having a pre-pended "1" is displayed and stored transparently to the user.

In other words, the method includes automatically adding and storing a "1" in front of the 10-digit CID phone number if the area code in the received phone number matches an entry in address book and if this address book entry includes a "1" at the front of the number. Accordingly, because the calling number is adjusted to conform to the requirements for dialing phone numbers having the same area code or local exchange as the calling number, a user can dial the calling number in a single operation by selecting the number when it is displayed in a menu.

In another embodiment of the present invention, a method for adjusting caller ID information includes the step of receiving at a call device, a caller ID message that includes a calling number (CN). The call device compares the format of the calling phone number to a set of predetermined criteria that are used to enable a "truncate" function. The criteria are based, for example on the length and content of the calling number. If a criterion of the set of predetermined criteria is met, then a truncate function is activated, wherein the calling number can be truncated by use of a context-sensitive "delete" button or key, or a similar button. Truncation of the calling number involves, for example, removal of an area code or a pre-pended "1" from that number. The context-sensitive "delete" button is operable to truncate the calling number only when a predetermined criterion is met. In addition, the length and form of the calling number dictates which, if any, numbers are removed when a "delete" button is pressed. Accordingly, a user is provided with a means to assure in a single pressing of a button that the proper deletion of numbers takes place for any calling number that is identified as needing truncation.

DETAILED DESCRIPTION OF THE INVENTION

In order to better describe aspects of the invention, reference is made to the figures in the discussion to follow. Embodiments of the present invention relate to systems and methods that facilitate adjusting received caller ID numbers so that the caller ID numbers are in proper format for a user to place an outgoing call to the phone number associated with the received caller ID number.

Figure 1A:
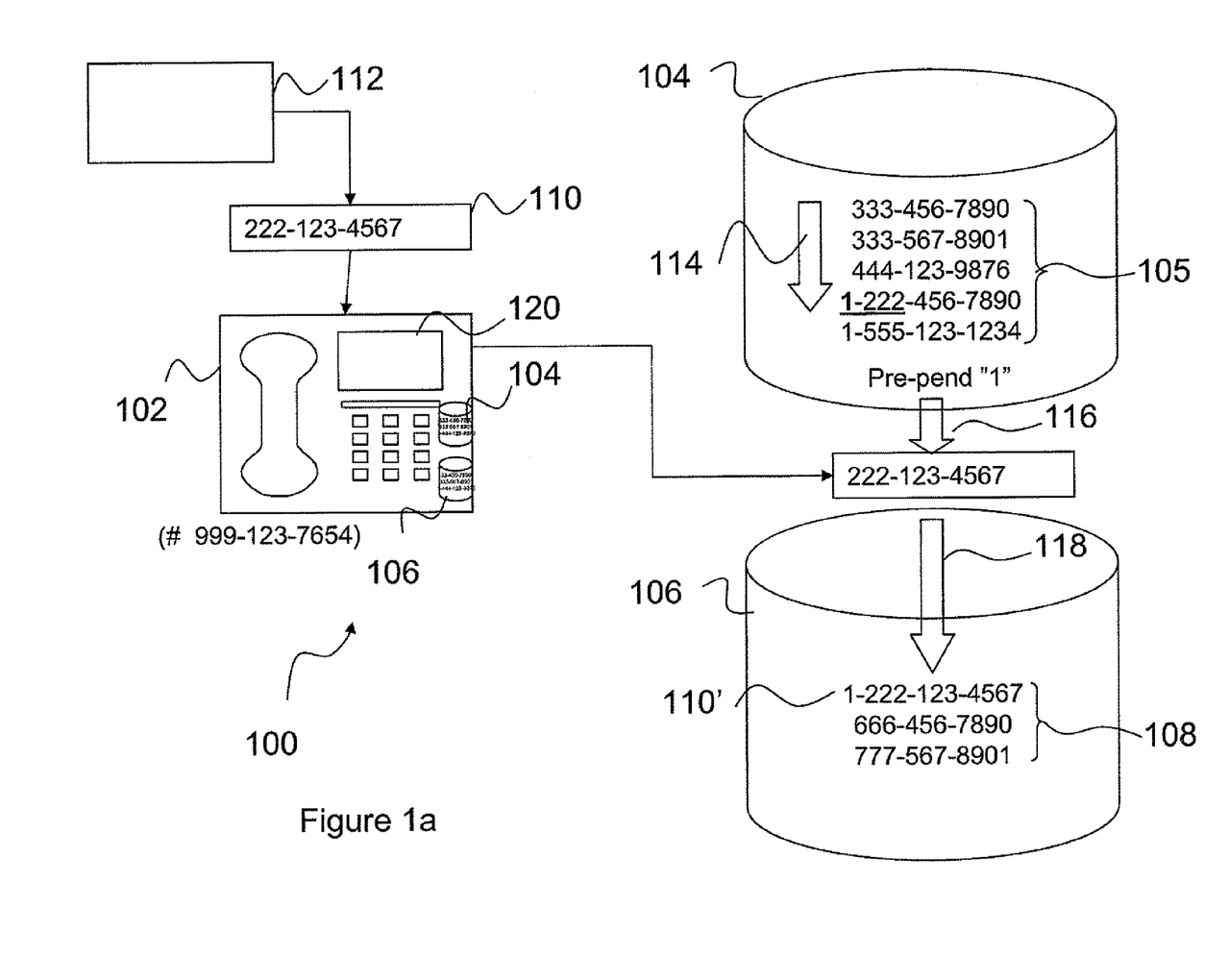
FIGS. 1a and 1b are schematic diagrams that illustrate the operation of a system for adjusting caller ID information, in accordance with an embodiment of the present invention.
Figure 1B:
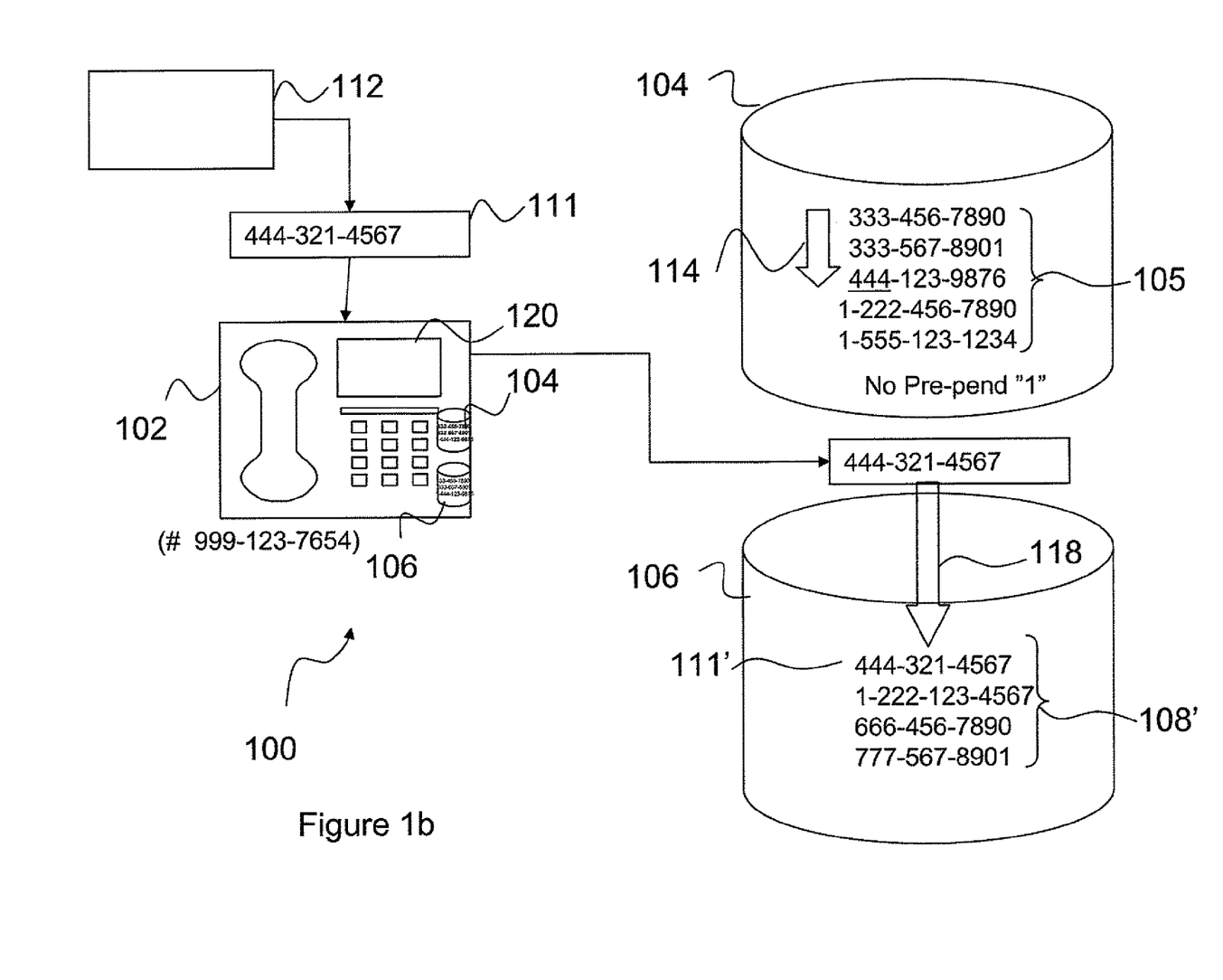

FIGS. 1a and 1b illustrate the operation of a system 100 for adjusting caller ID information, in accordance with an embodiment of the present invention. In the embodiment illustrated, system 100 includes a telephone device 102 that includes the capability of storing and displaying caller information such as caller ID information and, optionally, voice messages. Alternatively, telephone 102 may include no capability to store voice messages, but can be linked to a service provider that stores voice messages associated with missed calls. In one embodiment of the present invention, phone 102 and system 100 are the same entity. Accordingly, in the discussion to follow, unless otherwise indicated, system 100 and phone 102 generally refer to the same entity. However, in other embodiments of the present invention not explicitly depicted in FIGS. 1a and 1b, system 100 could be an answering or call storage device that is coupled to a telephone line associated with a telephone, in order to store caller ID information related to calls received over the telephone line.

System 100 includes reference database 104 and database 106, which can be a phone log database that includes a caller ID list 108 that contains calling party numbers associated with calls received at telephone 102. When caller ID message 110 is received from central office 112, system 100 acts to store caller ID information, such as the phone number of the calling party. This calling party information may be stored unaltered or in adjusted form in database 106 as discussed immediately below.

In the example illustrated in FIG. 1a, the calling party CID number includes the area code "222," which corresponds to the area code of the calling party phone and is located at the beginning of the calling party number. System 100 may store this information in a temporary memory, or buffer. System 100 also includes a processor (not shown) that executes a search of reference database 104 to match the area code of the caller ID message 110 to a phone number in reference phone list 105.

In a preferred embodiment of the present invention, reference database 104 is an address book database that includes a plurality of entries comprising address book phone list 105 as well as information associated with one or more of the address book list entries (not shown), such as contact party information corresponding to the phone list entries. However, as described farther below, reference database 104 may comprise a database separate from a phone book database, or reference database 104 may comprise a plurality of sub-databases including an address book database. As described further below with respect to FIGS. 2a and 2b, a separate, non-address book database may simply comprise a list of phone numbers that are used for the purposes of adjusting calling numbers, wherein the database does not contain contact party information other than a phone number. Likewise, phone list 105 may correspond to a phone list derived from a database separate from an address book or from a plurality of databases including an address book database. For the purposes of simplicity in the discussion to follow with respect to FIGS. 1a-1c, database 104 will be treated as an address book database.

The search of address book database 104 may simply be a scrolling operation 114 in which each number in list 105 is interrogated until a phone number having an area code (222) that matches that of message 110 is located. This operation can be performed by examining all phone numbers that have 10 or 11 digits and examining the numbers is the eighth, ninth, and tenth from right digits to determine if those numbers are all "2." As illustrated in FIG. 1a, search 114 stops when phone number 1-222-456-7890 is encountered. At this point, system 100 recognizes that a phone number having the same area code as the calling party caller ID number 110 has been found in list 105.

The area-code-matched-address book number can then be examined to determine if the number "1", is pre-pended to the telephone number, which, in this example, is the case. If it is determined that the previously stored phone number having a "222" area code includes a "1" at the beginning, the system recognizes that any newly received phone number having a "222" area code should also include a "1" at the beginning in order that the newly received number can be successfully dialed from the receiving phone. This is based on the assumption that the address book includes the complete and proper form for dialing a phone number having that area code. After determining that the number "1" is pre-pended to the located phone number in the address book, the temporarily stored number "222-123-4567" is retrieved and, in operation 116, pre-pended with the digit "1." Subsequently, in operation 118, adjusted calling party number 110' is stored in list 108. A user who subsequently scrolls through list 108 to examine caller ID phone number information associated with received calls will be provided with the correct form of the phone number (1-222-123-4567) to use for dialing the calling party. For example, list 108 can be provided on display 120 when a user enters into a call log menu or similar menu; alternatively, phone 102 could be configured to display list 108 to the user automatically on display 120.

In the example shown in FIG. 1b, on the other hand, calling party number 111 corresponds to an area code that does not have a pre-pended "1" associated with the area code for phone numbers listed in address book list 105. When search 114 encounters the first number having a "444" area code, it examines that number (444-123-9876) and determines that there is no pre-pended "1." Accordingly, when calling party number of message 111' is stored in list 108,' there is no appending operation performed. A user who wishes to dial the calling party number just received in message 111' will just select the 10-digit number for dialing without an extra "1," which is assumed not to be necessary for dialing from the user's phone to the designated area code.

In another embodiment of the present invention, system 100 is configured to perform a procedure similar to that illustrated in FIGS. 1a and 1b for calling numbers received within the same area code as the phone number associated with phone 102. In other words, the received calling number has only seven digits corresponding to a local exchange and number. In some cases, the CO 112 might require a "1" to be appended to a seven-digit number dialed between phone 102 and a party within the same area code. For example, based on the location of phone 102, CO 112 might designate certain exchanges within area code 222 that require a "1" to be appended to a calling number in order to be accessed from phones in the "999" exchange area of phone 102.

Figure 1C:
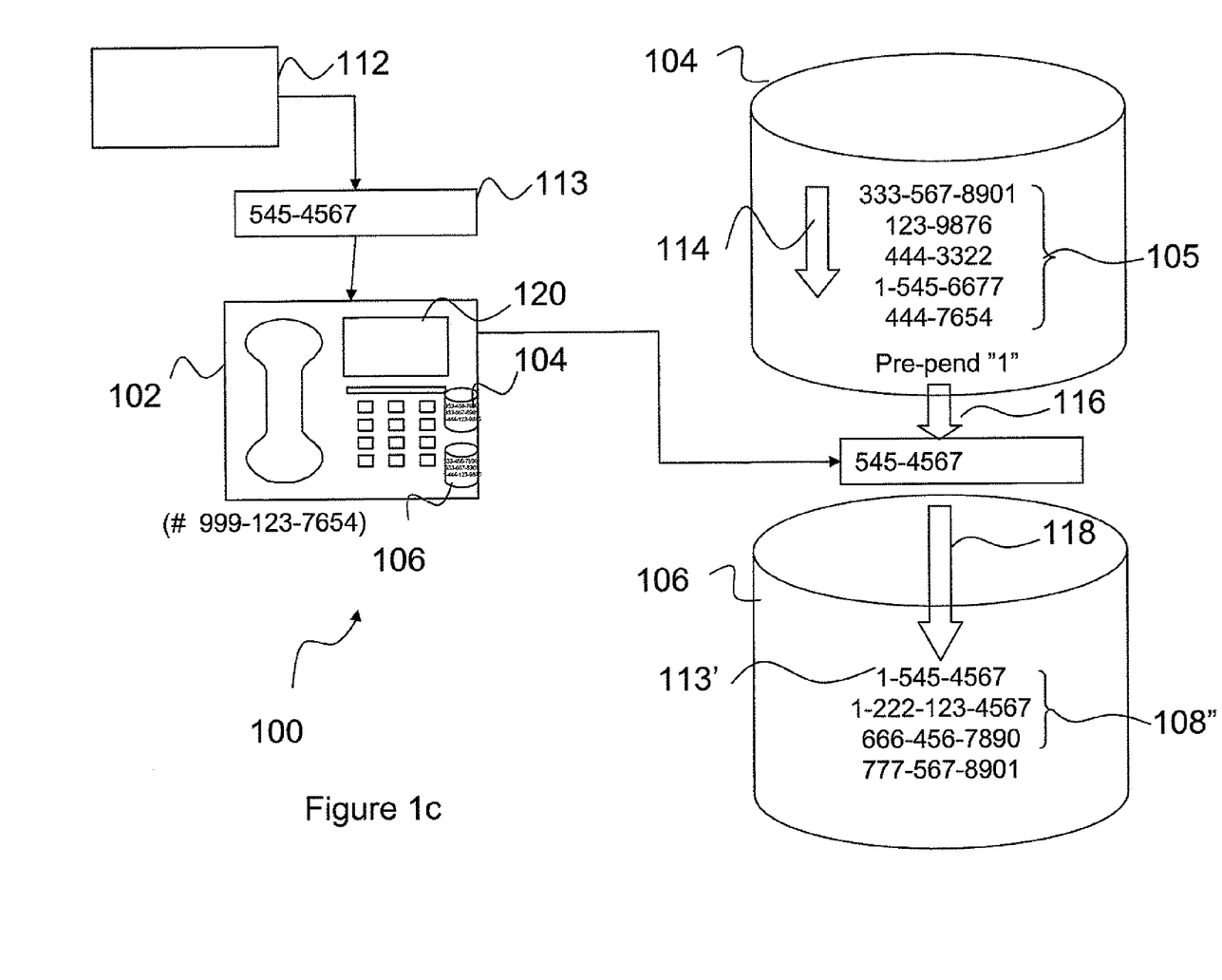
FIG. 1c is a schematic diagram that illustrates the operation of a system for adjusting caller ID information, in accordance with another embodiment of the present invention

FIG. 1c illustrates the operation of a system 100 for adjusting caller ID information, in accordance with another embodiment of the present invention in which a "1" is pre-pended on received intra-area code calling numbers according to information in the called party address book 104. After calling number "545-4567" is received in calling party number 113, list 105 is searched until a local number having a "545" exchange is found. This can be done by searching all numbers that have seven or eight digits and examining the seventh, sixth, and fifth from right numbers. In the example shown, list 105 includes the number "1-545-6677," which contains a pre-pended "1" that indicates a "1" should be pre-pended to any calls made to the "545" exchange from phone 102. Accordingly, a "1" is prepended to "545-4567" and the stored calling party number 113' is "1-545-4567" in list 108." Accordingly, a user simply selects adjusted calling number "1-545-4567" that may be provided on display 120 if interested in returning the phone call.

In other embodiments of the present invention, a caller ID calling number received at a called party phone can be adjusted to delete a pre-pended "1" in the received number in order to match the format required for dialing the calling number from the called party phone. For example, a CO might require that for a given local exchange or area code, a phone number be dialed from a user's phone without the use of any pre-pended "1." Thus, system 100 can be configured to receive a calling number having a pre-pended "1" and check list 105 to see if a received area code or local exchange of the calling number matches an entry in the list. If a match is found, then the matched entry in list 105 can be interrogated to see if it contains a pre-pended "1." If the matched entry does not contain a pre-pended "1," system 105 acts to remove the pre-pended "1" from the received calling number before storing the calling number.

Figure 2A:
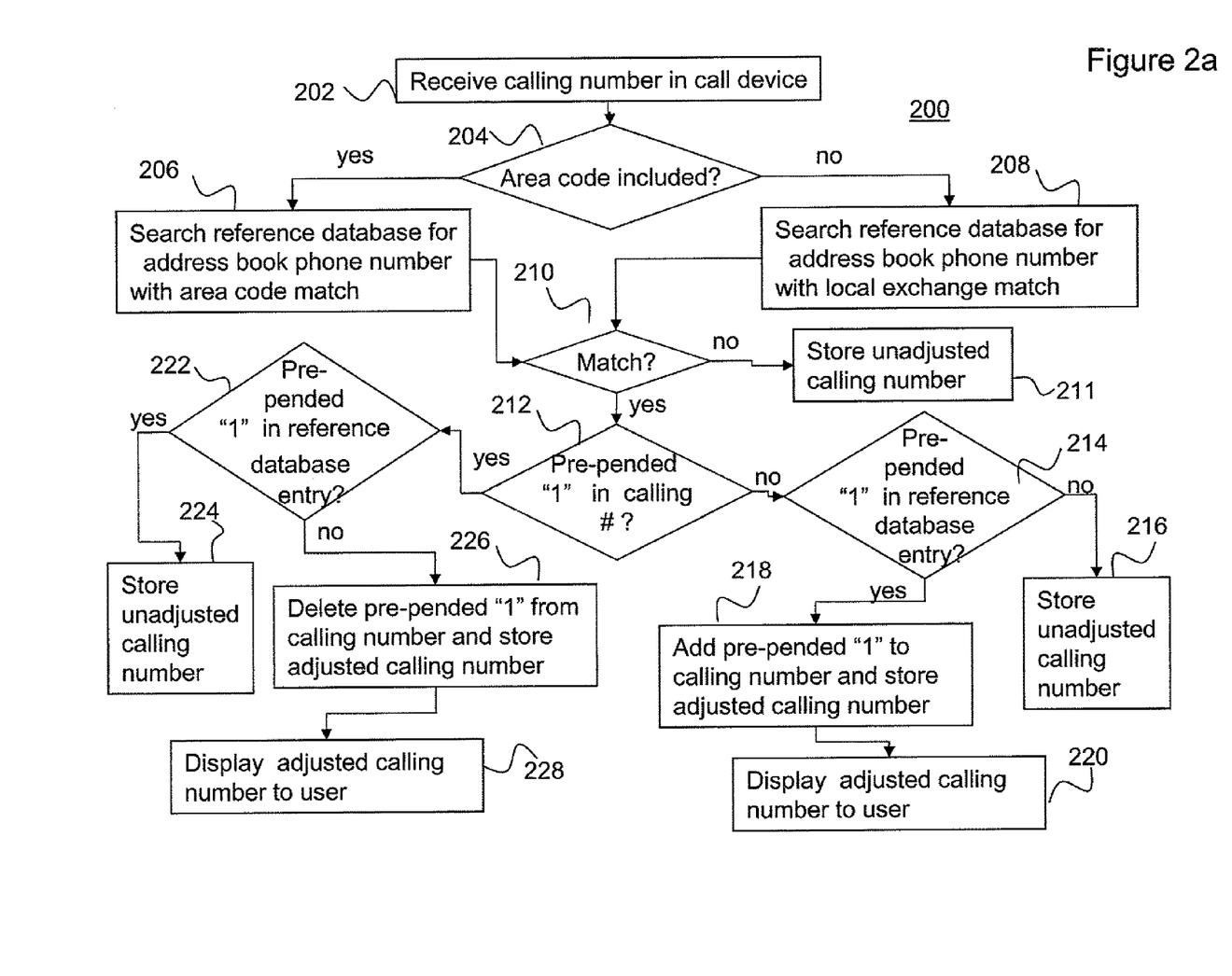
FIG. 2a is a flowchart that illustrates exemplary steps involved in a method for adjusting a calling number, in accordance with another embodiment of the present invention.

FIG. 2a illustrates exemplary steps involved in a method 200 for adjusting a calling number, in accordance with another embodiment of the present invention. In step 202, a calling number is received at a call device. The calling number can be a caller ID number received from a local caller or from a long distance caller. As received, the calling number may or may not contain a pre-pended "1." As explained in detail below with respect to the steps of FIG. 2a, the method 200 acts to identify numbers contained in the initial digits of the received calling party number, such as area code, local exchange, and pre-pended "1." Based upon either an area code or a local exchange number in the received calling number, a search is performed in a called party reference database, such as an address book, to identify a phone number containing a matching area code or local exchange. A telephone number entry in the reference database having a matched area code or local exchange is compared to the received calling number. If both the reference database phone number and calling number have a pre-pended "1" present in or absent from their respective numbers, no change is made to the calling number. If only one of two numbers contains a pre-pended "1," the received calling number is modified by the addition or subtraction of the pre-pended "1" as appropriate.

In step 204, the call device checks to see if the calling number includes an area code, in which case the process moves to step 206.

In step 206, as described in detail above with respect to FIGS. 1a and 1b, a reference database, such as an address book associated with the call device is interrogated to see if any phone number exists in the reference database having the same area code as the calling number. In a preferred embodiment of the present invention, the reference database includes at least an address book.

In step 204, if the calling number does not include an area code, the process moves to step 208.

In step 208, as described in detail above with respect to FIG. 1c, a reference database associated with the call device is interrogated to see if any phone number exists in the reference database having the same local exchange as the calling number.

In step 210, if an area code match is found or an exchange match is found for a calling number without an area code, the process moves to step 212. If no match is found, the process moves to step 211, where the unadjusted calling number is stored.

In step 212, the system examines the calling number to determine if a pre-pended "1" is included in the calling number. If no pre-pended "1" is detected, the process moves to step 214.

In step 214, the system searches the matched entry in the reference database to determine if it contains a pre-pended "1." If no prepended "1" is found, the process moves to step 216.

At step 216, the system recognizes that the received calling number matches the form of an entry in the reference database that has the same area code and/or local exchange as the calling number. Accordingly, the system stores the received calling number in unadjusted form in a database associated with the calling device, such as a caller ID call log.

If the system determines that the matched entry does contain a pre-pended "1," the process moves to step 218. In step 218, the system recognizes that the received calling number does not match the form of an entry in the reference database that has the same area code and/or local exchange as the calling number. In particular, the system recognizes that the calling number is missing a pre-pended "1." Accordingly, the system adds a pre-pended "1" to the calling number and subsequently stores the received calling number in adjusted form in a database associated with the calling device, such as a caller ID call log.

In step 220, the adjusted calling number having a pre-pended "1" is displayed to a user of the calling device, for example, when the user interrogates the caller ID log.

If the system determines that calling number was received with a pre-pended "1" in step 212, the process moves to step 222. In step 222, the system checks to see if the matched entry in the reference database also includes a pre-pended "1."

If the matched entry contains a pre-pended "1," the process moves to step 224. Because the matched entry includes a pre-pended "1," in step 224, the system stores the calling number in unadjusted form in a call device.

If the matched entry does not contain a pre-pended "1," the process moves to step 226. In step 226, the system recognizes that a phone number in the reference database having an area code and/or local exchange that matches the calling number does not have a pre-pended "1," and thereby determines that the pre-pended "1" in the received calling number should be deleted. The pre-pended "1" is deleted and the calling number without a pre-pended "1" is subsequently stored as an adjusted calling number in a device, such as the call device.

In step 228, the system displays an adjusted calling number that contains the originally received calling number, except with no a pre-pended "1." Accordingly, a user wishing to dial the calling number from the user's telephone does not have to adjust the stored calling number to dial out to the telephone associated with the calling number.

Figure 2B:
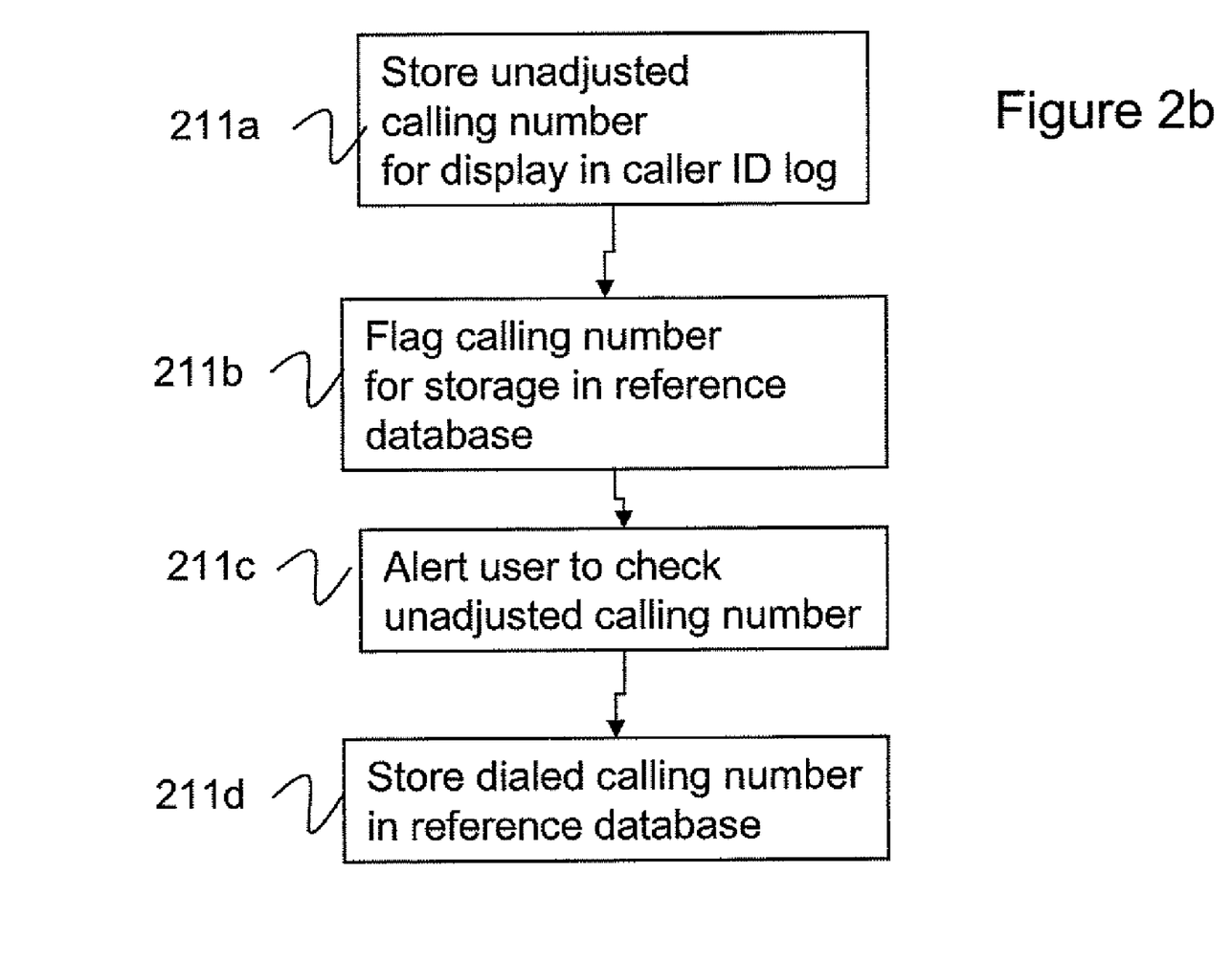
FIG. 2b is a flowchart that illustrates exemplary steps in a method for adjusting calling number information, in accordance with another embodiment of the present invention.

FIG. 2b is a flowchart that illustrates exemplary steps in a method for adjusting calling number information, in accordance with another embodiment of the present invention. In one embodiment of the present invention, the steps illustrated in FIG. 2b correspond to sub-steps of step 211 of FIG. 2a. In other words, the method of FIG. 2b takes place when no match is found between a calling number area code or exchange and corresponding entries in the called party address book. In step 211a, the unadjusted calling number is stored for display to the user, for example, in a caller ID call log.

In step 211b, the calling number is flagged for possible storage in a reference database. Since the system has determined that no phone number exists in the current reference database associated with the called party phone that has a matching area code or local exchange, it would be advantageous to store the proper form of the newly received calling number. If the newly received (first) calling number is stored in proper form in the reference database, a different (second) calling number received in the future having the same area code or local exchange could be automatically adjusted based on the form of the first calling number. Accordingly, the as-yet unadjusted calling number is flagged for possible storage in the reference database.

In step 211c, the user (called party) is alerted to check the calling number. Since the system has determined that no area code or exchange match exists in a reference database of the called party, the calling number cannot be automatically adjusted or adjudged as to whether adjusting is required. The user is therefore provided with an alert to allow for manual checking and adjusting of the calling number if needed. Preferably, the alert could be done in an unobtrusive manner, so that a user could be alerted that the correct format of the phone number is not known. The alert could constitute a means of highlighting the calling number, for example, an asterisk that appears when presented in a caller ID log on a display in the user's phone. The user would then understand that the phone number may not be formatted correctly and could take steps to check the number or ignore the alert and attempt to dial the number as received.

In step 211d, in order to successfully dial the calling number from the user phone, the user manually determines whether the calling number needs to be adjusted, by, for example, adding or subtracting a pre-pended "1." The user then dials the number, which is flagged for recording in the reference database. After the user dials the calling number, the dialed calling number is stored in the reference database. The system knows that the dialed calling number format, whether adjusted or unadjusted, is in proper format when dialed and accordingly stores the number in its dialed format. In this regard, the reference database need only contain dialed calling number information and need not include any information specific to a called party, such as address and name information associated with an address book entry.

The user could update the reference database with address book-type information as desired, or the dialed calling number could remain in the reference database simply for the purposes of automatically adjusting calling numbers having similar area codes or local exchanges that are received in the future.

In other embodiments of the present invention, the method 200 of FIG. 2a can be modified to account for telephone numbers having prefixes besides a pre-pended "1." For example, a user who wishes to dial phone numbers in a particular area code may be required to pre-pend "9-1" to the beginning of the phone number before dialing. The user's phone address book may accordingly store phone numbers in the given area code with the "9-1" prefix. Accordingly, in one embodiment of the present invention, if a relevant address book telephone number (whose area code matches that of a received calling number) contains a "9-1," the "9-1" prefix is pre-pended to the received calling number.

In another embodiment of the present invention, the user is provided with a means to select specific area codes for exemption from the automatic adjusting of calling number information as described above with respect to FIGS. 1a-2b. For example, the user may realize that within a specific area code, certain phone numbers require a pre-pended "1" in order to be dialed from the user's phone, while other phone numbers do not require the pre-pended "1." For example, are code 604 may include phone numbers that do not require adding "1" and phone numbers that do so require the pre-pended "1." In addition, those numbers within the area code requiring a pre-pended "1" for successful dialing may have no discernible pattern. Thus, when a new phone number having area code 604 is received, it will not be known as to whether that phone number requires a pre-pended "1" or not. Accordingly, the user may disable the phone device from searching the address book database when a new calling number having the area code in question is received. One means for doing this could be to enter a placeholder number "604-000-0000" into a beginning of an address book database, which alerts the device that the stored placeholder number is not a "proper" entry, because it knows that no phone numbers have all zeros as digits. Other phone number formats, such as a series of seven "9s" immediately following the area code, could serve the same purpose. It therefore interprets this improper entry to indicate that calling numbers having 604 area code are exceptions to the adjustment process, and does not attempt to adjust a received calling number having a 604 area code. Other received calling numbers having area codes that are not similarly flagged would be subject to adjustment as described in the Figures above.

In accordance with other embodiments of the present invention, a method for assisting a user in truncating received calling numbers is provided. In some instances, a user may easily recognize that the area code from a received calling number requires deletion before the user dials that number from the user telephone. In accordance with other embodiments of the present invention, a system and method are provided to facilitate user-assisted adjustment of a received calling number. For example, a user may determine that the pre-pended area code from a received calling number should be deleted. The system is configured to supply a convenient and intuitive means, such as a designated key that is enabled to perform only a predetermined operation, such as a deletion of a portion of a phone number based upon evaluation of that phone number.

Figure 3A:
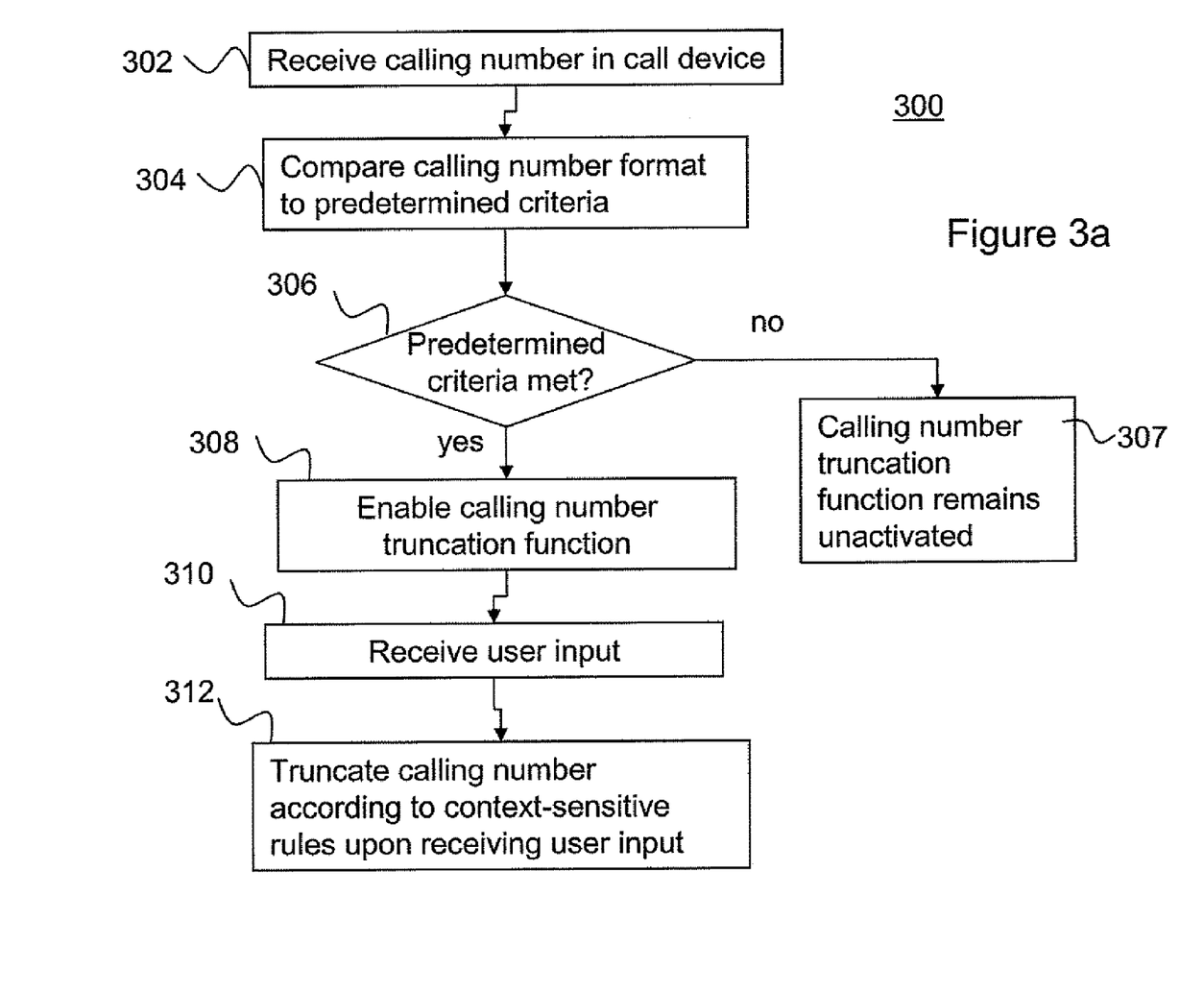
FIG. 3a is a flowchart that illustrates exemplary steps involved in a method for adjusting caller ID information according to another embodiment of the present invention.

FIG. 3a illustrates exemplary steps involved in a method 300 for adjusting caller ID) information according to another embodiment of the present invention. In step 302, a caller ID message that includes a calling number (also termed "CID number") is received at a call device. The calling number may be for example, an eight-, ten-, or eleven-digit number.

In step 304, the call device (system) compares the format of the calling phone number to a set of predetermined criteria that are used to enable a "truncate" function. The format of the predetermined criteria can involve, for example, the length and/or content of the calling phone number. The term "length," as used below in the discussion with respect to FIG. 3a, generally refers to the amount of digits contained in the number. Thus, the system may perform a scan of the calling number to first determine whether the received calling number corresponds to an eight-, ten-, or eleven-digit format. The term "content," as used herein, generally refers to the type of number that occupies the digits corresponding to the phone number. The system may search the first digit of the calling number to determine the content of that digit, for example, does the first digit correspond to a "1." If a predetermined criterion is met, a truncation operation can be enabled in the call device.

In one example, the system is configured at the factory to store a set of predetermined criteria. Alternatively, the system can be configured to accept a set of user-defined criteria that trigger the enabling of a truncation device if satisfied.

An example of a calling number that corresponds to a predetermined criterion is a calling number having an eight-digit length wherein the first digit is a "1." Another example is a calling number having an eleven-digit length wherein the first digit is a "1." Another example is example is a calling number having a ten-digit length.

In step 306, if the system determines that the received calling number fails to correspond to a predetermined criterion, the process moves to step 307, where a truncation operation remains unactivated. In step 306, if the system determines that the received calling number does correspond to a predetermined criterion, the process moves to step 308, in which the system triggers the enabling of a truncation operation. In one embodiment of the present invention, the set of predetermined criteria corresponds to those three criteria listed in the preceding paragraph. Thus, the system determines that a criterion for enabling a truncation operation has been met if the calling number is a ten-digit number or contains either eight or eleven digits in which the first digit is a "1."

In step 308, a truncation operation is enabled in the calling device or hardware associated with the calling device. For example, the calling device might comprise a telephone having caller ID storage and display capabilities. When the truncation operation is enabled, the telephone has the capability to receive input from a user through a user interface, where the input serves to truncate the received CID number.

In step 310, input is received in the calling device or associated hardware that is enabled to truncate the CID number. The user input may constitute selection of the calling number from a caller ID log. For example, the user may scroll through a list containing the calling number in question and select the desired calling number. The user may further select a "delete" key or other device that is enabled to perform the truncation operation.

In step 312, the enabled truncation operation is performed, such that the calling number is truncated according to a set of rules that serve to define which digits in the received CID number are to be deleted from the CID number when a user performs a permissible operation. The context-sensitive rules could comprise a predetermined set of rules that prescribe which digits of the calling number can be removed based on the format of the received calling number. For example, the calling device can be configured to operate a program or routine that recognizes the format of a received calling number that meets a predetermined criterion, as discussed above.

The calling device is then enabled to allow deletion through a user interface of only a predetermined set of digits of the CID number, where the predetermined set of digits is defined in the context of the length and content of the CID number, in other words, the predetermined criteria discussed above. For example, if a received CID number length is eight digits and the leading number is "1," the predetermined set of digits enabled for deletion is simply the first digit, because the first digit is deemed extra if the both the overall number length is eight and the digit contains the number "1." The calling device is then enabled to allow the deletion from the CID number of the leading number "1" only. Similarly, if a received CID number length is eleven digits and the leading number is "1," the predetermined set of numbers is also simply the pre-pended number "1," wherein the calling device is enabled to allow the deletion from the CID number of the leading number "1" only. In another example, if a received CID number length is ten digits, the predetermined set of numbers constitutes the first three numbers of the CID number corresponding to the area code, wherein the calling device is enabled to allow the deletion from the CID number of the area code only.

Table I below illustrates an exemplary rule set that can be applied in accordance with the method of FIG. 3a discussed above. As discussed above, the rules are designed to enable only deletion of specific digits from a received calling number based on the format of the calling number. Furthermore, if the format of the calling number does not meet one of the criteria listed in a)-c), no truncation operation is enabled, that is, no digits can be deleted from the calling number.

TABLE I

| Received calling number format | Permissible deletions from calling number |
| --- | --- |
| a) 10 digits, no pre-pended "1" | First three digits |
| b) 11 digits, pre-pended "1" | First digit |
| c) 8 digits, pre-pended "1" | First digit |
| Format other than a)-c) | No digits |

In one embodiment of the present invention, a user interface, such as a "delete" key or similarly labeled key is enabled to cause deletion of the pre-pended "1" or area code when the key is depressed. The term "delete" key, as used herein, generally refers to any key, button, selection wheel, joystick, touchscreen object, or similar device that enables a selected object, such as text or numbers, to be deleted. The "delete" key is operable to perform a deletion operation when pressed or otherwise physically manipulated, such that a device associated with the "delete" key receives a signal.

Figure 3B:
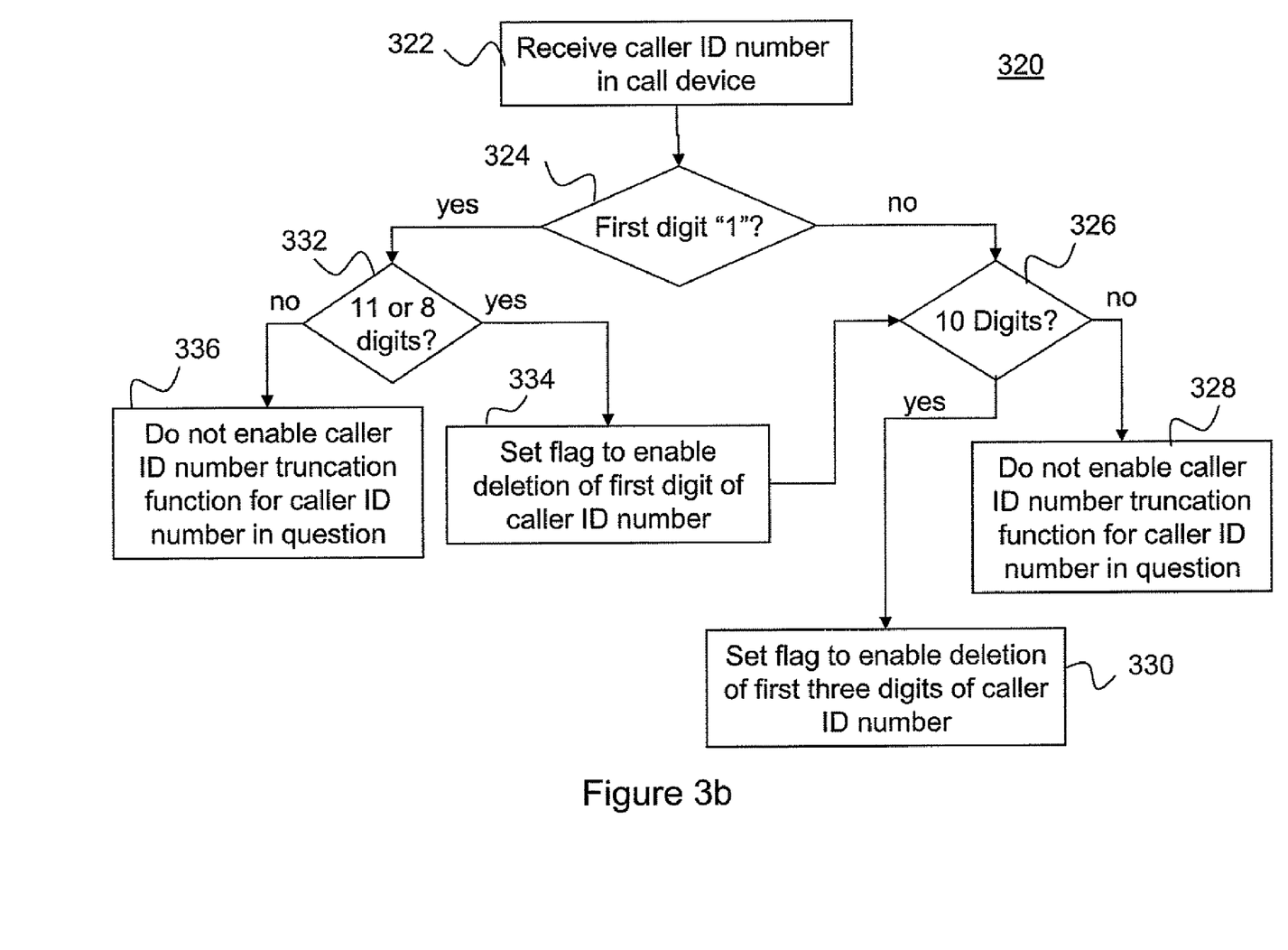
FIG. 3b is a flowchart that illustrates exemplary steps involved in a method for adjusting a caller ID number, in accordance with a further embodiment of the present invention.
Figure 4:
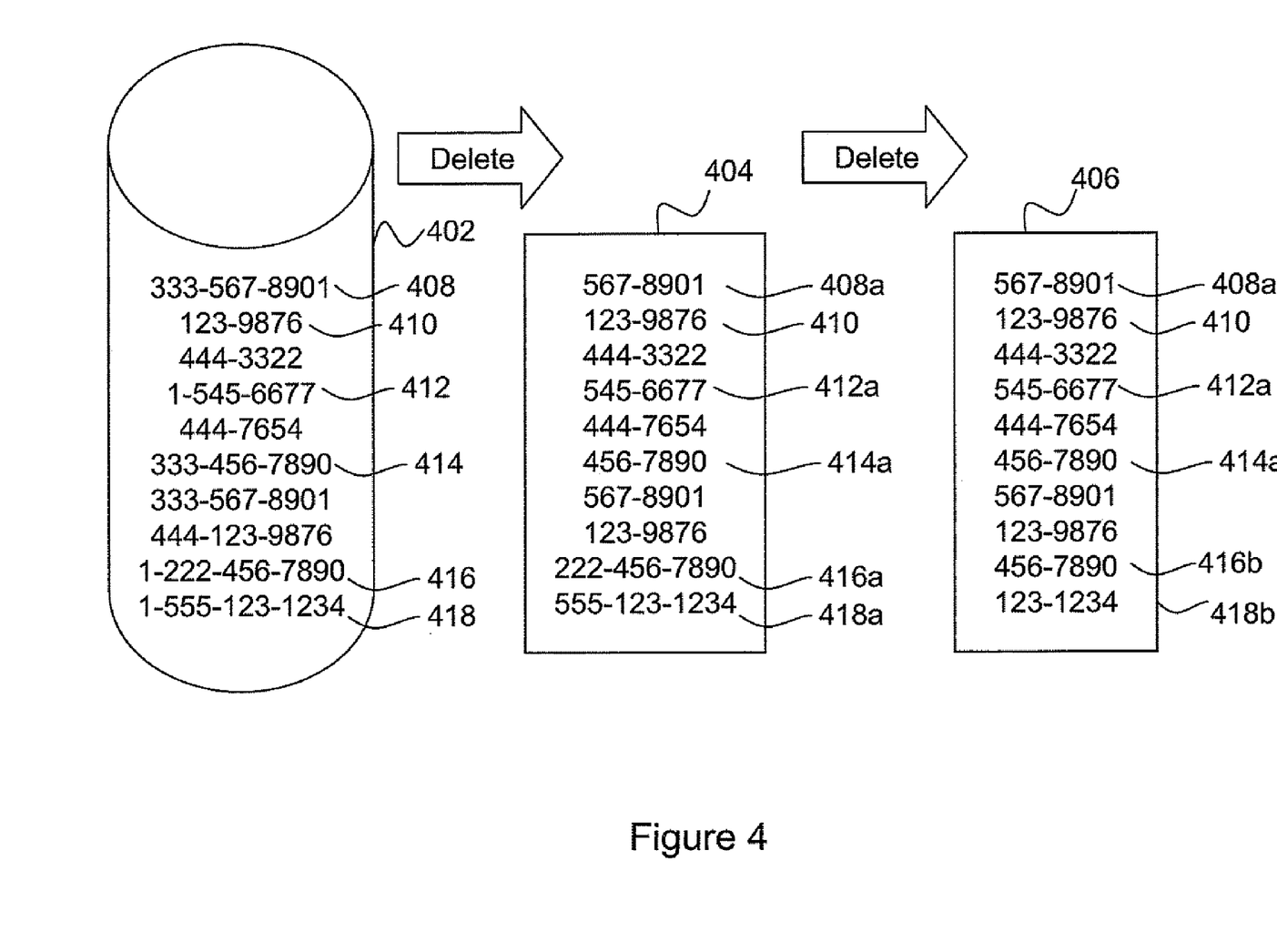
FIG. 4 is a schematic diagram that illustrates the operation of context-sensitive selection for deletion of digits provided in a caller ID number, in accordance with one embodiment of the present invention.

In embodiments of the present invention described herein with respect to FIGS. 3a-4, the operation of a "delete" key is restricted to truncation of only specific digits from qualified phone numbers. For example, a user who enters a caller ID log that causes a set of calling ID numbers to be displayed, may determine that a given calling ID number should be truncated. The user may recognize, for example, that a pre-pended "1" or an area code needs to be removed, which removal can be accomplished by simply pressing a delete key. Because of the context of the received calling ID number, that is, the length and content of the specific digits of the calling ID number, the call device determines what, if any, digits within the calling ID number can be removed. The call device then enables the permissible digits for removal to be deleted in a single user operation, such as the pressing of a "delete" key. However, the call device limits the function of the "delete" key so that only truncation of the predetermined numbers (digits) can be performed. Any deliberate or inadvertent pressing of a "delete" key is ineffective to delete digits from the calling number if those digits are not part of the digits that were predetermined to be permissible for removal.

In other embodiments of the present invention, the order of the steps performed in FIG. 3a can be altered or some steps can be performed simultaneously. For example, steps 302-308 and 312 may be performed after receiving user input in step 310. After receiving a calling number in the call device, the number may be displayed to a user in a menu that allows the user to select the calling number for deletion of certain digits in the number. The user may press a "delete" key when the desired calling number is selected, after which steps 304-308 are performed, in which the system interrogates the selected calling number to determine whether to enable the "delete key" to allow for truncation.

FIG. 3b illustrates exemplary steps involved in a method 320 for adjusting a caller ID number, in accordance with a further embodiment of the present invention. The method of FIG. 3b defines a set of steps that can be used to mark a calling number so that the calling number can be truncated based on user input through a device, such as a "delete" key. The steps illustrated in FIG. 3b comprise a variation of the process generally depicted in steps 304-308 of FIG. 3a. Furthermore, the method of FIG. 3b effectively embodies the rules illustrated in Table I. The method 320 could be implemented as a routine operable upon any received calling number to determine which, if any, digits of a received calling number are permitted to be deleted.

In step 322, a caller ID number is received by a call device. The number can be stored, for example, in a caller ID log.

In step 324, the device checks to see if the caller ID number contains the number "1" in the first digit. If the caller ID number does not contain a "1" in the first digit, the process moves to step 326.

In step 326, the device checks to see if the caller ID number has 10 digits. If the number does not contain 10 digits, a determination is made that the caller ID number does not contain an area code, whose presence in any phone number (based on the North American convention) would produce at least 10 digits for that number. If the number does not contain 10 digits, the process moves to step 328.

In step 328, because the received caller ID number does not contain a "1" in the initial digit, and because the received caller ID number does not contain an area code, no truncation operation is enabled with respect to the caller ID number in question.

If in step 326, it is determined that the caller ID number does contain 10 digits, the process moves to step 330. In step 330, a flag is set that enables deletion of the first three digits of the received caller ID number. Because the caller ID number does not have a pre-pended "1" and does contain 10 digits, it is assumed that the first three digits contain the area code. Accordingly, the caller ID number is flagged so that a user can select and delete the area code using a device, such as a "delete" key.

If, in step 324, it is determined that the caller ID number does contain a "1" in the initial digit, the process moves to step 332. In step 332, the caller ID number is checked to see if it contains either eight or eleven digits. If it contains either eight or eleven digits, the process moves to step 334.

In step 334, the initials "1" is assumed to not be part of the area code or local exchange of the caller ID number. This is because a phone number having merely a local exchange at the beginning only has seven digits, while a phone number merely containing an area code at the beginning only has ten digits. Accordingly, the eight or eleven digit phone number is identified as having a pre-pended "1," which causes a flag to be set. The flag identifies the caller ID number so that a user can select and delete the first digit of the caller ID number using a device, such as a "delete" key. The process then moves to step 326 and proceeds therefrom as described above.

It in step 332, the caller ID number is identified as not having eight or eleven digits, the process moves to step 336.

In step 336 a determination is made that a caller ID truncation operation is not to be enabled with respect to the received caller ID number.

FIG. 4 illustrates exemplary aspects involved in a method and system for editing a phone number list using context-sensitive deletion of digits of phone numbers, in accordance with one embodiment of the present invention. List 402 represents a list of phone numbers that can be caller ID numbers provided in a caller ID phone log in a telephone or other calling device. However, the list may be another phone number list, such as a list from an address book. List 402 includes seven-, eight-, ten- and eleven-digit numbers. Examples of seven-digit numbers include entry 410; examples of eight-digit numbers include entry 412; examples of ten-digit numbers include entries 408 and 414; examples of eleven-digit numbers include items 416 and 418.

For the purposes of the discussion to follow, lists 402, 404, and 406 will be assumed to pertain to caller ID phone number logs. List 404 represents a list of caller ID numbers that corresponds to list 402 after each entry in list 402 is subjected to a user-initiated delete operation, in accordance with one embodiment of the present invention. For example, a user may be presented with list 402 in a graphical display that allows the user to select an entry for possible editing. In one example, the user could be allowed to select the calling ID numbers individually or be allowed to select all the calling ID numbers in list 402 for editing at once. The user may recognize that certain caller ID entries (numbers) require truncation and may wish to delete the superfluous numbers in each entry. For the purposes of simplicity of illustration, it will be assumed that the user has determined that all the caller ID numbers correspond to phone numbers that require the area code and any pre-pended "1" to be deleted from the number. Accordingly, the user may wish to delete all the superfluous numbers from every entry in the list in an efficient manner.

In accordance with one embodiment of the present invention, a user could accomplish deletion of superfluous digits in list 402 by scrolling through list 402 and highlighting those entries that have extra digits. Alternatively, in accordance with another embodiment of the present invention, the user could highlight the entire list with the knowledge that only those numbers enabled for truncation would have the desired digits removed. Accordingly, list 404 can represent the result of a single pressing of a "delete" button when all of the entries in list 402 are selected, either singly, or all together. Notably, the operation of pressing the "delete" button once while every entry in list 402 is selected changes some of the entries in list 402, while leaving others intact. For example, ten-digit entry 408 is truncated into seven-digit entry 408*a* of list 404. This truncation takes place because the system recognizes that entry 408 contains ten digits, and is enabled to remove the first three digits corresponding to the area code when the delete key is depressed. Entry 410, on the other hand, which initially contains seven digits, remains unadjusted after the delete key is depressed. This is because a seven-digit caller ID number does not satisfy the predetermined criteria that trigger a caller ID number to be subject to truncation through a "delete" key. Eight-digit entry 412 is truncated in list 404 into seven-digit entry 412*a*. In the latter case the system recognizes that entry 412 contains eight digits, including a pre-pended "1," which causes the system to enable removal of the pre-pended "1" only when the delete key is depressed. Finally, eleven-digit entries 416 and 418 are both transformed into ten-digit entries, 416*a* and 418*a*, respectively, because the system is configured to recognize that each eleven-digit entry contains a pre-pended "1," thereby enabling each entry to be subject to removal of the pre-pended "1," when a "delete" key is pressed.

List 406 represents a list of caller ID numbers that corresponds to list 404 after all entries in list 404 are subjected to a user-initiated delete operation. Thus, the caller ID numbers in list 406 each correspond to the state of a received caller ID number shown in list 402 after a delete key is pressed twice when the caller ID number in question is selected. For example, after pressing the "delete" key once for each entry in list 402, the user might view list 402 and determine that entries 416*a* and 418*a* both require removal of their respective area codes. Accordingly, the user decides to press the "delete" key and remove the area codes from calling numbers 416*a* and 418*a*, resulting in list 406.

In sum, the list 402 can be transformed into list 406 by user operations in which the user individually selects each entry in list 402 and presses a "delete" key while each entry is selected. The truncation of each entry proceeds in accordance with the rules described above, such as those listed in Table I. Thus, truncation of number 416 to yield number 416*b* requires performing a "delete" operation twice, while truncation of number 408 to yield number 408*a*, requires only one "delete" operation. In the latter case, further attempts to use a "delete" button do not change the number 408*a*. Similarly, a number such as number 410, if selected for deletion, does not change upon pressing of a "delete" button or similar operation. Thus, in accordance with embodiments of the present invention, a user can attempt to perform "delete" operations on all calling number entries in a call log one or more times, to ensure that those entries are adjusted to the form that is proper for calling from the user's phone.

In one embodiment of the present invention, a user interface, such as one that displays list 402 or 404 is configured such that all the entries therein can be selected at once for performance of a deletion operation. Thus, for example, a user could scroll through list 402 and select any or all the entries, upon which the "delete" key or a similar key could be pressed twice. Displaying of entries in list 402, for example, could be accomplished by entering an "edit" mode in which the call device would limit the effect of a "delete" key to the truncation operations described above. Alternatively, the call device could be configured such that when the calling number entries are displayed they are automatically editable for the purposes of operations, such as truncation, but could not be inadvertently deleted in toto. Thus, in accordance with one embodiment of the present invention, list 402 could be transformed into list 406 with merely two presses of the "delete" key after the entries are displayed and selected.

List 406 provides further illustration of operation of context-sensitive deletion of digits in a caller ID number, in accordance with an embodiment of the present invention. As indicated in FIG. 4, seven-digit caller ID numbers 408*a*, 410, 412*a*, and 414*a* all remain unchanged between list 404 and 406, in other words, after the "delete" key is pressed for a second time. This is because a seven-digit caller ID number does not satisfy the predetermined criteria that trigger the caller ID number to be subject to truncation through a "delete" key. On the other hand, caller ID entries 416*a* and 418*a* of list 404 are truncated upon pressing the "delete" key into seven-digit entries 416*b* and 418*b* in list 406 because they do satisfy a predetermined criterion that triggers the caller ID number to be subject to truncation through a "delete" key.

Thus, in accordance with the embodiment of the present invention illustrated in FIG. 4, a user is provided with a convenient means to truncate caller ID digits from one or a series of caller ID numbers, with the assurance that only the proper digits are removed. The user need only select the caller ID numbers are to be truncated, and need not worry if, for example, seven-digit numbers are selected for truncation, since depressing of a "delete" key when a seven-digit number is highlighted will not delete the number.

In another embodiment of the present invention, the truncation process is not be limited to 11, 10 and 8 digit numbers, wherein the leading digit of 11 and 8 digit numbers consists of a "1". In this additional embodiment, the system could be configured to recognize and delete "international dialing codes" (e.g., "011" for USA and Canada, or "00" for many European countries or equivalent long distance codes for other countries). Similarly, the system can be configured to recognize and delete country codes (e.g. "1" for USA or Canada, "49" for Germany or "852" for Hong Kong). This embodiment may be useful on a portable phone (e.g. cell phone) wherein the user may have stored an international number as it can be dialed from the user's home country. When a user is then traveling in a foreign country, once the user's portable phone is connected to a local service provider, the user may need to delete the long distance code and, in some cases, the country code contained in a stored phone number, in order to dial the stored phone number properly. For example, to dial a local German party in Germany based on a stored phone number, the user may have to delete the "011" and the "49" that are stored in the phone number for dialing from, for example Canada, The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for adjusting caller identification (ID) information, comprising;
   receiving, at a call device associated with a called party, a caller ID message that includes a calling number (CN);
   identifying one of an area code and a local exchange of the calling number;
   searching entries in a called party address book associated with the call device;
   selecting from the called party address book a matched telephone number entry having at least one of an area code and a local exchange that matches a corresponding area code or local exchange of the calling number; and
   adjusting the calling number if only one of the calling number and matched telephone number contains a pre-pended "1."

2. The method of claim 1, further comprising:
   storing the adjusted calling number in a call log that includes caller ID information;
   indicating that the adjusted calling number is available for selection by a user; and
   dialing the adjusted calling number when the adjusted calling number is selected by the user.

3. The method of claim 1, wherein the matched telephone number entry contains a pre-pended "1" and wherein the adjusting the calling number comprises pre-pending a "1" to the calling number.

4. The method of claim 3, wherein the calling number comprises a ten-digit number having a three digit area code, and wherein the matched telephone number entry comprises an eleven digit number having a pre-pended "1."

5. The method of claim 3, wherein the calling number comprises a seven-digit number having a three digit local exchange portion, and wherein the matched telephone number entry comprises an eight digit number having a matching local exchange portion and a pre-pended "1."

6. The method of claim 1, wherein the matched telephone number entry does not contain a pre-pended "1" and wherein the adjusting the calling number comprises deleting a pre-pended "1" from the calling number.

7. The method of claim 6, wherein the calling number comprises one of:
   an eleven-digit number having a first area code that corresponds to a ten-digit matched telephone number comprising the first area code;
   and an eight-digit number having a first local exchange portion that corresponds to a matched telephone number that comprises the first local exchange portion.

8. The method of claim 2, wherein the indicating the adjusted calling number is available for selection comprises:
   displaying a list of one or more calling numbers from a caller ID log that includes the adjusted calling number; and
   highlighting the adjusted calling number by at least one of a position and appearance of the calling number.

9. The method of claim 8, wherein the dialing the adjusted calling number comprises a single user action when the calling number is highlighted.

10. The method of claim 9, wherein the single user action comprises one of pressing a button, pressing a screen, moving a joystick in a predetermined direction, pressing a selection dial, and issuing a verbal command.

11. The method of claim 1, wherein the searching the called party address book comprises automatically scrolling through a list of entries in the called party address book until a matched entry is found.

12. The method of claim 1, wherein the call device comprises a telephone that is configured to receive and store caller ID information from at least one service provider.

13. The method of claim 1, wherein the calling number is not adjusted if a matched telephone number entry in the address book containing a matching area code comprises only zeros in addition to the area code.

14. A method for adjusting caller identification (ID) information, comprising:
   receiving, at a call device associated with a called party, a caller ID message that includes a calling number (CN);
   comparing a format of the calling number to a predetermined set of criteria;
   enabling a truncation operation in a "delete" key of the call device if the format meets a criterion in the set of criteria;
   receiving user input at the "delete" key of the call device that is operable to truncate the calling number;
   performing the truncation operation on the calling number according to a set of prescribed rules;
   storing the truncated calling number in an address book;
   selecting from the address book the truncated calling number if the truncated calling number has at least one of an area code and a local exchange that matches a corresponding area code or local exchange of a second calling number; and
   adjusting the second calling number if only one of the second calling number and the truncated calling number contains a pre-pended "1."

15. The method of claim 14, wherein the comparing the format of the calling number comprises:

determining whether the received calling number contains a pre-pended "1;" and determining an amount of digits in the calling number.

16. The method of claim 15, wherein if the received calling number comprises ten digits and contains no pre-pended "1," the truncation operation is enabled to delete the first three digits of the calling number.

17. The method of claim 15, wherein if the received calling number comprises a pre-pended "1" and further comprises one of eight and eleven digits, a truncation operation is enabled to delete the first digit of the calling number.

18. The method of claim 14, wherein the call device comprises a telephone, and wherein the user interface is a "delete" key.

19. The method of claim 14, further comprising:
displaying a call log including the calling number on a display in the call device; and
receiving a selection of the calling number, wherein the display is operable to indicate when the calling number is selected.

20. The method of claim 14, wherein the comparing the format of the calling number comprises:
determining whether the received calling number contains a set of digits comprising an international dialing code; and
determining whether the received calling number contains a set of digits comprising a country code.

21. The method of claim 20, wherein the truncation function is enabled if the received calling number contains one or more of an international dialing code and a country code.

22. A method for editing a phone number list, comprising:
displaying a plurality of phone numbers in a display of a telephone device;
receiving a selection of the plurality of phone numbers;
receiving a single input from a truncation device when the plurality of phone numbers is selected;
enabling a truncation operation operable for only the selected phone numbers that qualify for truncation according to preset rules;
performing a truncation operation on each of the qualified phone numbers; and
displaying an edited list of the phone numbers that includes the truncated phone numbers.

23. The method of claim 22, wherein the truncation device comprises a "delete" key and wherein the receiving the input from the truncation device comprises receiving a signal from the "delete" key that is pressed a single time when the plurality of phone numbers is simultaneously selected.

24. The method of claim 22, wherein the preset rules comprise:
a) enabling deletion of the first three digits of a telephone number when the telephone number comprises ten digits and does not contain a pre-pended "1";
b) enabling deletion of the first digit of a telephone number when the telephone number comprises eleven digits and does contain a pre-pended "1";
c) enabling deletion of the first digit of a telephone number when the telephone number comprises eight digits and does contain a pre-pended "1"; and
d) disabling deletion of any digits of a telephone number when none of a), b), and c) applies.

25. A method for adjusting caller identification (ID) information, comprising:
receiving, at a call device associated with a called party, a caller ID message that includes a calling number (CN);
identifying one of an area code and a local exchange of the calling number;
searching entries in a called party reference database associated with the call device;
storing the calling number for display in unadjusted form if the reference database does not contain a telephone number entry having at least one of an area code and a local exchange that matches a corresponding area code or local exchange of the calling number;
alerting the user to check the calling number;
flagging the calling number for storage in the reference database; and
storing in the reference database the calling number in a format employed by the user to dial the calling number.

* * * * *